Oct. 12, 1965  D. D. GRIEG  3,212,056
DUAL TRANSDUCER DEVICE
Filed June 22, 1961  3 Sheets-Sheet 1
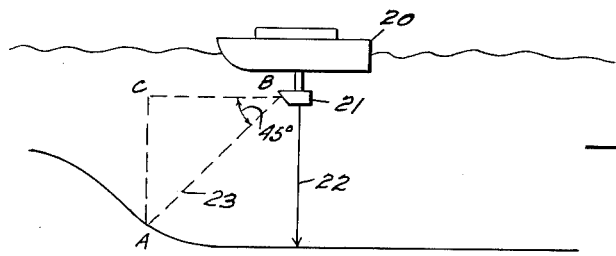
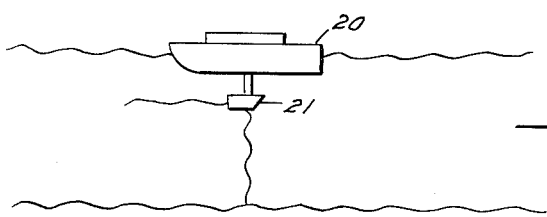
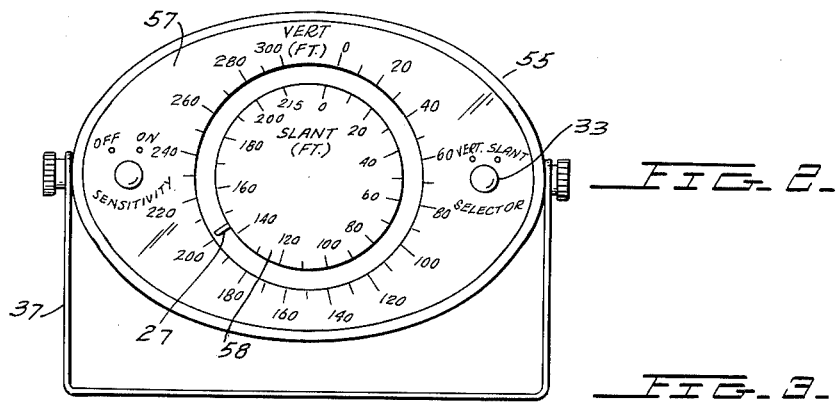
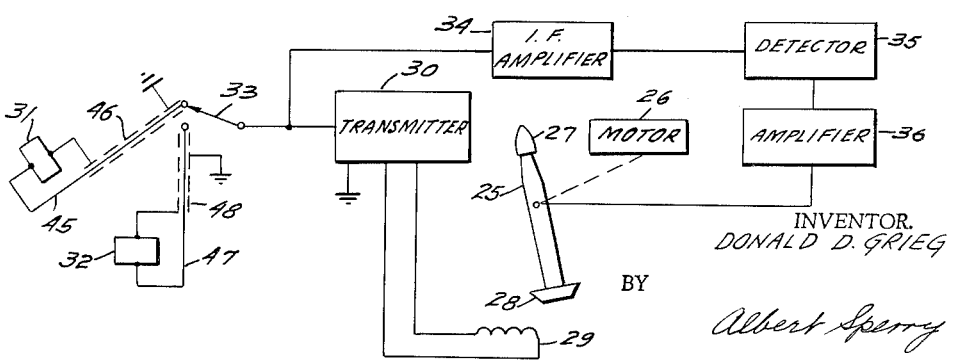
INVENTOR.
DONALD D. GRIEG
BY Albert Sperry
ATTORNEY

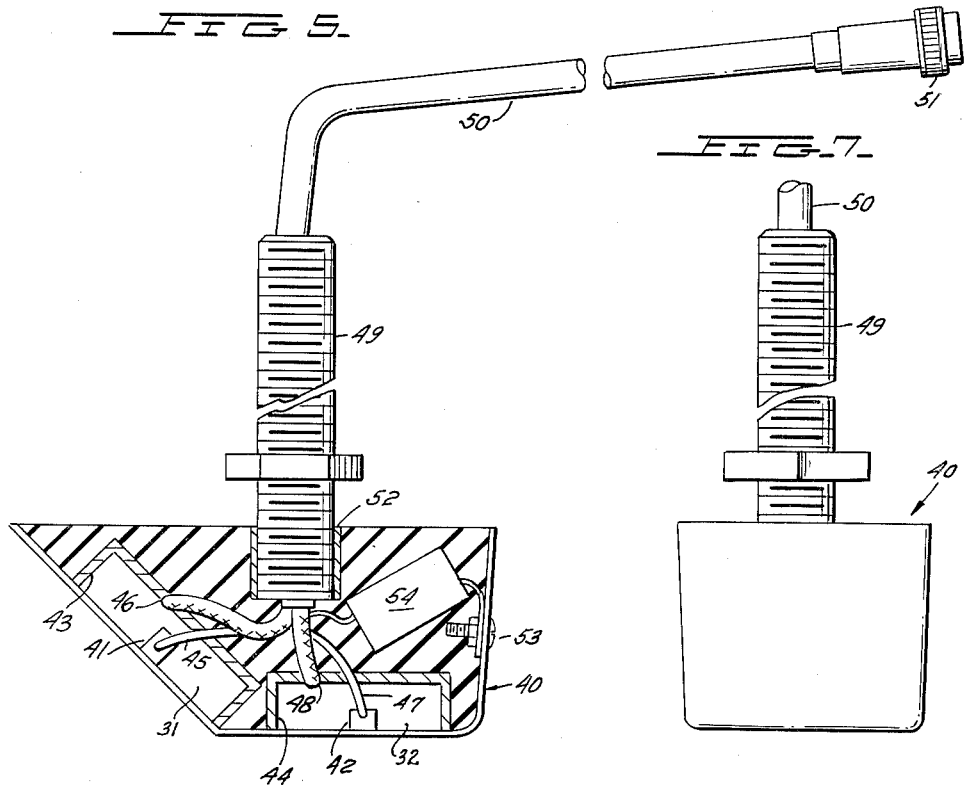
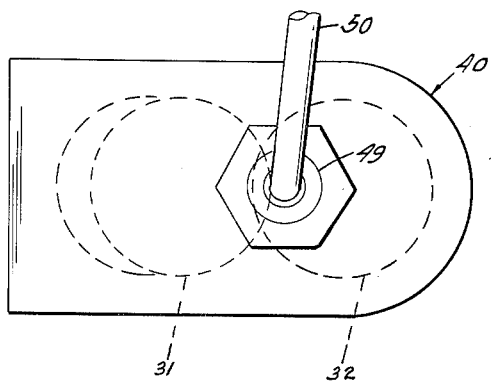

Oct. 12, 1965    D. D. GRIEG    3,212,056
DUAL TRANSDUCER DEVICE
Filed June 22, 1961    3 Sheets-Sheet 3
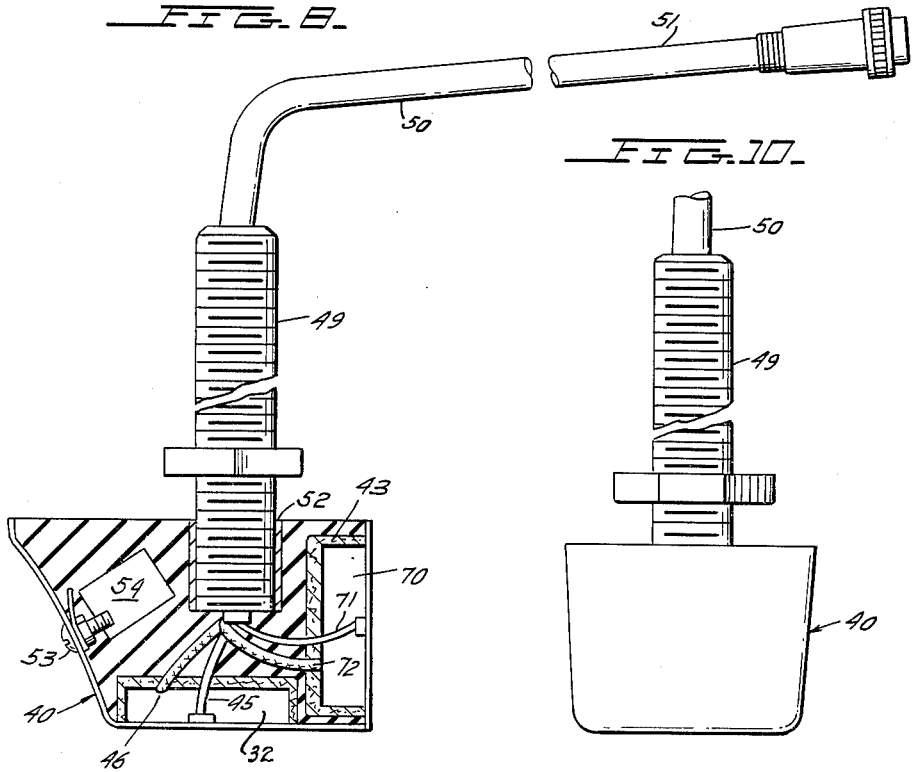
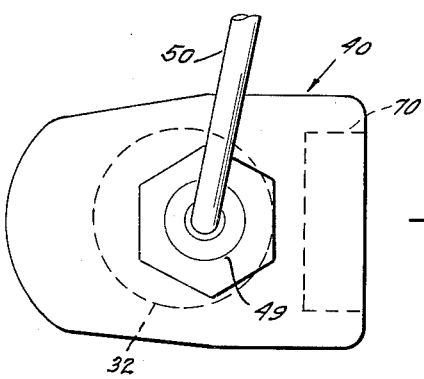
INVENTOR.
DONALD D. GRIEG
BY
Albert Sperry
ATTORNEY

3,212,056
DUAL TRANSDUCER DEVICE
Donald D. Grieg, North Caldwell, N.J., assignor to Electronic Research Associates, Inc., Cedar Grove, N.J., a corporation of New Jersey
Filed June 22, 1961, Ser. No. 118,932
2 Claims. (Cl. 340—9)

This invention relates to a dual transducer structure contained within a single novel housing for use as a dual transducer for generating a first and second sonar beam in a first and second direction respectively.

The novel dual transducer structure of the invention is particularly applicable to systems of the type shown in my copending application Serial No. 118,933, filed June 22, 1961, entitled "Distance Measuring System." The system set forth in my above noted copending application, as well as in my copending application Serial No. 35,673, filed June 13, 1960, now Patent No. 3,122,719 entitled "Distance Measuring Device" provide for the simultaneous or sequential measurement of two parameters such as the distance ahead of a boat and the distance below the boat, or the distance below the boat and the distance below the boat at some distance ahead of the boat (slant depth).

The present invention provides a novel housing means whereby the transducer for each of the parameter measurements is contained within a novel single housing, and are arranged to give improved operational characteristics to the measuring system.

Generally, a first and second transducer mounted at angles to one another and arranged to generate the sonar beam in a preferred respective direction are contained within a single housing. The transducers are then surrounded with a relatively soft material such as cork to acoustically isolate them from one another when the housing is thereafter filled with a potting medium such as an epoxy resin. The novel housing is then connected to a boat in any usual manner. If desired, more than two transducers can be provided within the housing as where depth, slant depth, and distance measurement is contemplated. Moreover, the housing can be formed in a mold to avoid the shell housing.

Accordingly, a primary object of this invention is to provide a novel dual transducer arrangement for sonar devices.

A further object of this invention is to provide at least a first and second transducer within a common housing for use in a sonar system where the transducers send out sonar beams in different respective directions.

A further object of this invention is to provide a novel common housing arrangement for a first and second transducer structure wherein the transducers are mechanically isolated from one another within the housing.

Another object of the invention is to provide a novel common housing arrangement for a plurality of transducers.

These and other objects of this invention will become apparent from the following description when taken in connection with the drawings, in which:

FIGURE 1 shows a boat equipped with the novel single transducer housing of the present invention which includes a first transducer for generating a sonar beam for measuring depth below the boat and a second transducer for generating a sonar beam forward of the boat for measuring the slant depth.

FIGURE 2 illustrates a typical instrument for delivering a reading of the vertical and slant depth measurements made by the transducer structure of FIGURE 1.

FIGURE 3 illustrates the electrical circuitry associated with the transducers and instruments of FIGURES 1 and 2.

FIGURE 4 illustrates a modification of the dual transducer structure of FIGURE 1 wherein a vertical sonar beam and a horizontal sonar beam are generated for depth below and distance ahead measurements respectively.

FIGURE 5 is a side cross-sectional view of the novel unitary transducer housing structure of FIGURE 1.

FIGURE 6 is a top plan view of the transducer of FIGURE 5.

FIGURE 7 is a front plan view of the transducer of FIGURE 5.

FIGURE 8 is a side cross-sectional view of the transducer structure arranged in accordance with FIGURE 4.

FIGURE 9 is a top plan view of FIGURE 8.

FIGURE 10 is a front plan view of FIGURE 8.

Referring first to FIGURE 1, I have illustrated a small boat 20 which has a transducer housing 21 connected thereto which, as will be shown more fully hereinafter and in accordance with the invention, contains transducer elements which generate a first sonar beam 22 downwardly and a second sonar beam 23 at an angle to the surface of the water. The sonar beam 22, of course, measures distance below the boat, while beam 23 which is at some fixed angle to the surface of the water, such as 45° delivers, a measure of the distance AB which, when multiplied by the sine of 45°, is equal to the depth AC.

The indicating instrument and its associated electrical circuitry for making the measurement of the vertical depth and slant depth AC in FIGURE 1 are shown schematically in FIGURES 2 and 3 which essentially reproduce what I have shown in my above noted copending application Serial No. 118,933. Thus, as shown in FIGURE 3, the instrument is provided with a pointer 25 which is rotatably driven by a motor 26. One end of pointer 25 has a neon flash tube 27 connected thereto, while its other end has, for example, a permanent magnet 28 connected thereto. As permanent magnet 28 is rotated, magnet 28 passes a coil 29 to generate a synchronizing pulse in coil 29 which turns transmitter 30 on for a short time. The transmitter 30 will then generate a pulse of high frequency voltage which is connected to one of transducers 31 or 32, depending upon the position of selector switch 33.

Thus, when magnet 28 passes coil 29, transmitter 30 will cause transducer 31, for example, to emit a sonar signal such as sonar signal 23 of FIGURE 1. In a similar manner, if selector switch 33 has been connected to transducer 32, the beam 22 of FIGURE 2 would be generated.

When the sonar beam generated by one of the transducers 31 or 32 strikes an object and is reflected as an echo, it generates an electrical signal in the appropriate transducer which is applied to the I.F. amplifier 34 wherein the term "I.F." refers generally to intermediate frequencies which are frequencies in the kilocycle and megacycle frequency range as contrasted to the use of this term for heterodyne systems. This signal is then detected in detector 35 and again amplified as a sharp pulse in amplifier 36, the output of which is connected to neon bulb 27 by an appropriate brush connection.

The neon bulb 27 at the end of pointer 25 has, at this time, rotated to an advanced position, depending upon the time delay between the original transmission of the sonar signal by the transducer 31 or 32 and the reception of the echo. Thus, the bulb 27 will be flashed at a position on an indicating scale which is the equivalent of the distance of the object which causes the reflection of the sonar signal.

The instrument housing of FIGURE 2 which is mounted, for example, in a gimbal arrangement 37 has the neon bulb 27 swept around an outer scale labeled "vertical depth" which corresponds to the vertical depth below the boat and a central scale labeled "slant" which indicates the slant depth AC in FIGURE 1.

The scale to be read, of course, depends upon the position of selector switch 33. It will be noted that the slant scale is calibrated to be $1/\sqrt{2}$ times the scale calibration of the vertical scale where the transducer beam 23 of FIGURE 1 is at a 45° angle to the surface of the boat. Thus, the actual distance measured, which is AB, will be read in terms of the distance AC so that the slant depth or depth ahead of the boat will be directly indicated on the slant depth scale.

It is now possible to consider the actual construction of the novel dual transducer device which is constructed in accordance with the present invention. A first embodiment of this novel arrangement, in accordance with the system of FIGURES 1, 2 and 3, is shown in FIGURES 5, 6 and 7. Turning now to those figures, I have illustrated the novel dual transducer device as contained with a common shell 40 which directly receives one surface of each of transducers 31 and 32, where transducer 31 is mounted at a 45° angle with respect to transducer 32. The shell 40 has been made of a vinyl material, although it could be of any appropriate material such as an epoxy or Lucite. The angle of mounting of transducer 31 depends upon the desired angle of the depth ahead beam to water surface.

The inner surface of shell 40 is preferably roughened to provide good adherence between an epoxy cement secured between the lower surfaces of transducers 31 and 32 and the inner shell body.

The transducers 31 and 32 can, for example, be polarized barium titanate polycrystalline disks which have their opposite surfaces silvered where at least one of the electrodes such as the lower electrode of each of the disks are provided with extending tabs 41 and 42 for transducers 31 and 32, respectively, which receive terminals from the transducer driving circuitry.

The transducers 31 and 32 are then surrounded by cork envelopes 43 and 44 respectively, which provide acoustic isolation between transducers 31 and 32 and cause rear wave cancellation. The actual thickness of the cork used depends upon the actual nature and arrangement of the transducers and can be easily established by simple tests.

Prior to the covering of the transducers with cork, conductors are connected to the transducer electrode. Thus, conductors extending from selector switch 33 are formed of respective shielded cables where the shield for each cable serves as a ground return lead. For example, the cable connected to transducer 31 has its central lead 45 connected to tab 41 and its shield 46 connected to the upper silver electrode surface of the transducer. In a like manner, the cable for transducer 32 is comprised of the central conductor 47 connected to tab 42 and its shield 48 which is connected to the upper electrode of transducer 32.

These cables are then taken through a high impact plastic stud 49 which is connected to an elongated tubular housing 50 which terminates in a shielded plug connector 51 which can be connected to the appropriate connecting means going, for example, to selector switch 33 in FIGURE 3.

A neoprene bushing 52 surrounds the end of stud 49, as shown, so that there will be a minimum acoustical transmission between the transducer housing and the stud 49.

A grounding lug 53 is then connected to shell 40 and secured thereto in any desired manner, and is connected to one terminal of a capacitor 54 whose other terminal is connected to the two shields 46 and 48 of the cables connected to transducers 31 and 32. In this manner, the shields are A.-C. grounded to the water within which the transducer housing is immersed.

Capacitor 54, stud 49 and bushing 52 are appropriately held in place with respect to the interior of shell 40, and shell 40 is filled with a potting medium such as an epoxy resin which is then cured, whereby a rigid unitary assembly is formed. It will be noted that the cork coverings 43 and 44 permit piezoelectric action of the transducers 31 and 32 (or magnetostrictive action, if such elements are used) even though a rigid potting medium is used.

In operation, it has been found that a device of the type shown in FIGURES 5, 6 and 7 will transmit beams having an approximately 8° spread in directions normal to their surfaces.

In the foregoing, the housing has included shell 40 which contains the various elements of the device. Satisfactory results can also be obtained where the various elements are held together in a mold and potted in the mold so that the shell is avoided. In this case, a window of an appropriate material such as vinyl, epoxy or Lucite will be cemented to the outer faces of the transducer elements and will extend to the outer surface of the mold to protect and couple the transducers to the water.

As a second embodiment of the invention, and for use in systems which generate a vertical sonar beam and horizontal sonar beam (as in copending application Serial No. 35,673), the housing arrangement can be modified to that shown in FIGURES 8, 9 and 10.

In FIGURES 8, 9 and 10, components similar to those of FIGURES 5, 6 and 7 have been given similar identifying numerals and serve the same functions. The major difference between the two embodiments is that the depth ahead transducer 31 of FIGURES 5, 6 and 7 is replaced by a distance ahead transducer 70 which will generate a substantially horizontal sonar beam. This transducer receives a central cable 71 having a shield 72 in a manner similar to that described above, and is associated with appropriate electrical circuitry such as that described in copending application Serial No. 35,673.

The foregoing description specifically illustrates the novel invention for use with two transducer elements. It will, however, be apparent that this would include the extension to three or more transducers within a common housing where, for example, three parameters are to be measured. By way of example, three transducers may be arranged within a common housing so that the first generates a horizontal beam, the second generates a slant beam, while the third generates a vertical beam. Equipment for use with this type of transducer is illustrated in my copending application Serial No. 118,933 referred to above.

Although this invention has been described with respect to its preferred embodiments it should be understood that many variations and modifications will now be obvious to those skilled in the art, and it is preferred, therefore, that the scope of this invention be limited not by the specific disclosure herein but only by the appended claims.

What is claimed is:

1. A transducer structure for generating pressure waves in a first and second direction respectively; said transducer structure including a first and second transducer in a common housing; said first and second transducers being acoustically insulated from one another; said first transducer being secured adjacent a first wall of said housing; said second transducer being secured adjacent a second wall of said housing; said first and second walls being at an angle to one another and being perpendicular to said first and second directions respectively; the portions of said first and second transducers which extend away from said housing walls being surrounded by a layer of vibration-absorbent material for acoustically insulating said first and second transducers; said housing being filled with a rigid potting compound; said vibration-absorbent material mechanically isolating said first and second transducers from said potting compound and absorbing back waves;

said housing including a conductive member extending from the inside of said housing to an area external of said housing; said housing having a capacitor therein; one side of said capacitor being connected to said conductive member; the other side of said capacitor being connected to one electrode of each of said transducers.

2. A transducer structure for generating pressure waves in a first and second direction respectively; said transducer structure including a first and second transducer in a common housing; said first and second transducers being acoustically insulated from one another; said first transducer being secured adjacent a first wall of said housing; said second transducer being secured adjacent a second wall of said housing; said first and second walls being at an angle to one another and being perpendicular to said first and second directions respectively; the portions of said first and second transducers which extend away from said housing walls being surrounded by a layer of vibration-absorbent material for acoustically insulating said first and second transducers; said housing further including one end of a hollow plastic stud embedded in said rigid potting compound, and a bushing of resilient material surrounding said one end of said hollow plastic stud to acoustically insulate said hollow plastic stud from said potting compound; the lead conductors for said first and second transducers passing through said hollow plastic stud; said first and second transducers being rigidly maintained within said housing by said potting compound.

References Cited by the Examiner
UNITED STATES PATENTS

| | | |
|---|---|---|
| 1,486,821 | 3/24 | Williams. |
| 2,411,910 | 12/46 | Turner. |
| 2,416,314 | 2/47 | Harrison _____ 340—10 |
| 2,480,535 | 8/49 | Alois et al. _____ 340—10 |
| 2,497,680 | 2/50 | Massa _____ 340—10 |
| 2,922,140 | 1/60 | Levine et al. _____ 340—9 |
| 3,027,540 | 3/62 | Howatt _____ 340—10 |

FOREIGN PATENTS

| | | |
|---|---|---|
| 1,205,419 | 8/59 | France. |

CHESTER L. JUSTUS, *Primary Examiner.*

LEWIS H. MYERS, KATHLEEN CLAFFY, *Examiners.*